United States Patent
Lopatin et al.

(10) Patent No.: US 9,761,882 B2
(45) Date of Patent: Sep. 12, 2017

(54) MANUFACTURING OF HIGH CAPACITY PRISMATIC LITHIUM-ION ALLOY ANODES

(71) Applicant: Applied Materials, Inc., Santa Clara, CA (US)

(72) Inventors: Sergey D. Lopatin, Morgan Hill, CA (US); Dmitri A. Brevnov, Santa Clara, CA (US); Eric H. Liu, Los Altos, CA (US); Robert Z. Bachrach, Burlingame, CA (US); Connie P. Wang, Mountain View, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/443,821

(22) Filed: Feb. 27, 2017

(65) Prior Publication Data
US 2017/0237074 A1  Aug. 17, 2017

Related U.S. Application Data

(63) Continuation of application No. 14/997,690, filed on Jan. 18, 2016, now Pat. No. 9,583,770, which is a (Continued)

(51) Int. Cl.
*H01M 4/13* (2010.01)
*H01M 4/62* (2006.01)
(Continued)

(52) U.S. Cl.
CPC ............ *H01M 4/626* (2013.01); *H01M 4/02* (2013.01); *H01M 4/0404* (2013.01);
(Continued)

(58) Field of Classification Search
CPC ...... H01M 2004/021; H01M 2004/027; H01M 4/02; H01M 4/0404; H01M 4/0452;
(Continued)

(56) References Cited

U.S. PATENT DOCUMENTS

2011/0151322 A1* 6/2011 Joo .................. H01M 4/134
429/209

* cited by examiner

*Primary Examiner* — Patrick Ryan
*Assistant Examiner* — Ben Lewis
(74) *Attorney, Agent, or Firm* — Patterson + Sheridan LLP

(57) ABSTRACT

High capacity energy storage devices and energy storage device components, and more specifically, to a system and method for fabricating such high capacity energy storage devices and storage device components using processes that form three-dimensional porous structures are provided. In one embodiment, an anode structure for use in a high capacity energy storage device, comprising a conductive collector substrate, a three-dimensional copper-tin-iron porous conductive matrix formed on one or more surfaces of the conductive collector substrate, comprising a plurality of meso-porous structures formed over the conductive current collector, and an anodically active material deposited over the three-dimensional copper-tin-iron porous conductive matrix is provided. In certain embodiments, the three-dimensional copper-tin-iron porous conductive matrix further comprises a plurality of columnar projections formed on the conductive current collector with the plurality of meso-porous structure formed on the plurality of columnar projections.

13 Claims, 5 Drawing Sheets

Related U.S. Application Data continuation of application No. 14/001,826, filed as application No. PCT/US2012/026991 on Feb. 28, 2012, now Pat. No. 9,240,585.

(60) Provisional application No. 61/447,591, filed on Feb. 28, 2011.

(51) Int. Cl.
| | |
|---|---|
| *H01M 4/02* | (2006.01) |
| *H01M 4/134* | (2010.01) |
| *H01M 4/04* | (2006.01) |
| *H01M 4/66* | (2006.01) |
| *H01M 4/64* | (2006.01) |
| *H01M 4/36* | (2006.01) |
| *H01M 4/1395* | (2010.01) |
| *H01M 4/38* | (2006.01) |

(52) U.S. Cl.
CPC ......... *H01M 4/0452* (2013.01); *H01M 4/134* (2013.01); *H01M 4/1395* (2013.01); *H01M 4/366* (2013.01); *H01M 4/38* (2013.01); *H01M 4/64* (2013.01); *H01M 4/661* (2013.01); *H01M 4/625* (2013.01); *H01M 2004/021* (2013.01); *H01M 2004/027* (2013.01); *Y02E 60/122* (2013.01); *Y02P 70/54* (2015.11)

(58) Field of Classification Search
CPC .... H01M 4/134; H01M 4/1395; H01M 4/366; H01M 4/38; H01M 4/625; H01M 4/64; H01M 4/661; Y02E 60/122
See application file for complete search history.

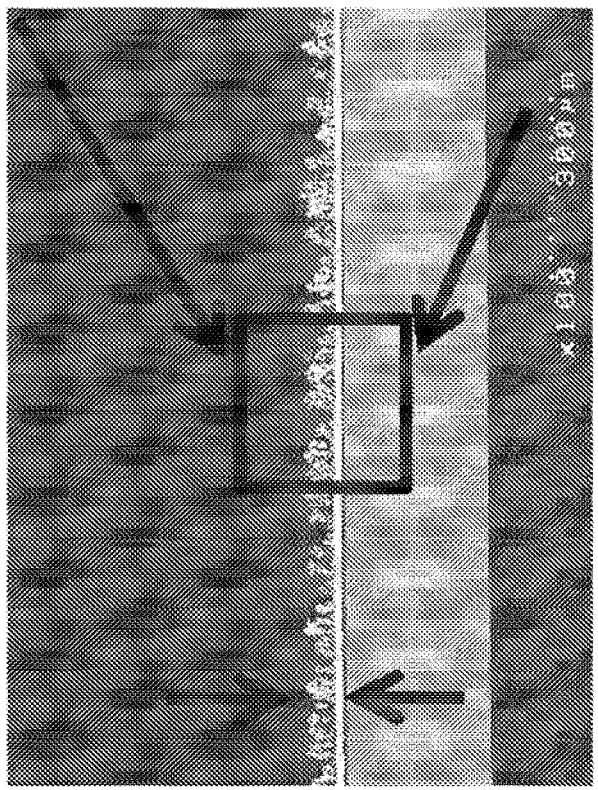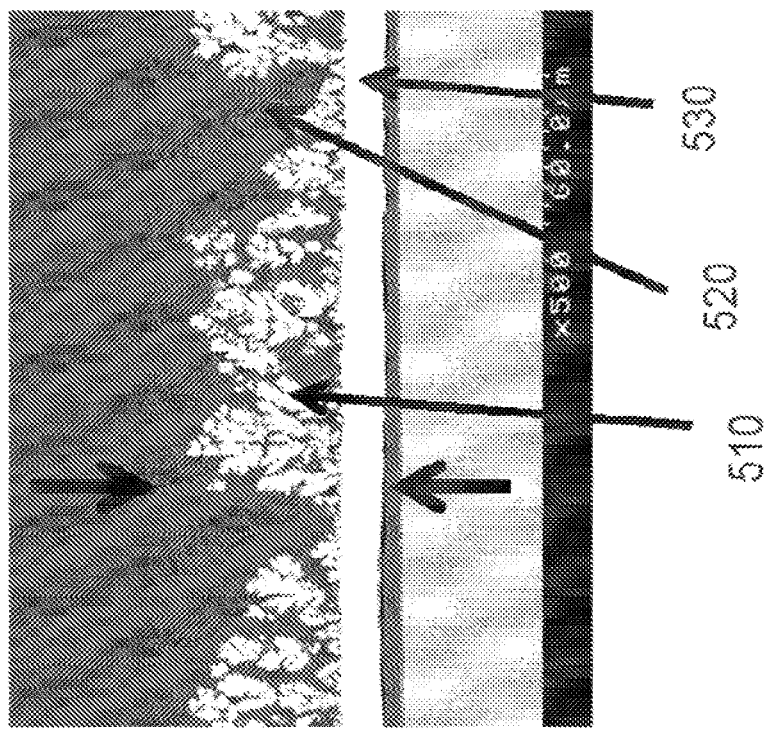
FIG. 5A
FIG. 5B

MANUFACTURING OF HIGH CAPACITY PRISMATIC LITHIUM-ION ALLOY ANODES

CROSS-REFERENCE TO RELATED APPLICATIONS

This application is a continuation of U.S. patent application Ser. No. 14/997,690, filed Jan. 18, 2016, which is a continuation of U.S. patent application Ser. No. 14/001,826, filed Sep. 23, 2013, which is the national stage entry of International Application Serial No. PCT/US2012/026991, filed Feb. 28, 2012, which International Application claims the benefit of U.S. Provisional Patent Application Ser. No. 61/447,591, filed Feb. 28, 2011. The above-referenced patent applications are herein incorporated by reference in their entirety.

BACKGROUND OF THE INVENTION

Field of the Invention

Embodiments of the present invention generally relate to high capacity energy storage device and energy storage device components, and more specifically, to a system and method for fabricating such high capacity energy storage devices and storage device components using processes that form three-dimensional porous structures.

Description of the Related Art

High-capacity energy storage devices, such as lithium-ion (Li-ion) batteries, are used in a growing number of applications, including portable electronics, medical, transportation, grid-connected large energy storage, renewable energy storage, and uninterruptible power supply (UPS).

A transformation of Li-ion battery (LIB) volume manufacturing technology is necessary to achieve successful commercialization of vehicle electrification. Significant progress is needed to address technical performance, reliability, manufacturing cost requirements, and industrial engineering for Gigawatt Hour (GWh) scale factories.

A lithium ion battery is a highly integrated device with many elements that all have to be engineered to achieve design and production targets. Typically, the Li-ion battery cell elements include cathode and anode electrodes, insulated by a porous separator saturated in a liquid electrolyte in a package with contacts. The cathode material layer may be bound to an aluminum (Al) current collector and an anode material layer is bound to a copper (Cu) current collector. Current collector thickness is determined by manufacturing transport constraints rather than cell resistance contribution, the separator provides electrical isolation of the anode and the cathode while preventing physical shorting and has sufficient porosity for lithium ion conductivity.

Contemporary cathode electrode materials include particles of lithium transition metal oxides bonded together using polymer binders with conductive fillers such as carbon black. The most widely used binder is the Polyvinylidene Fluoride (PVDF). Electrodes are formed by slot die coating with a slurry mixture of active materials, binder, and carbon black dispersed in the most common organic solvent for PVDF, N-Methylpyrrolidone (NMP) which requires elaborate volatile organic compound (VOC) capture equipment. The electrode is subsequently dried, with the dryer often being 40 to 70 meters long due to the slow rate needed to prevent cracking of the electrode. A calendering step is used to compress the electrode to increase the electrical connections among active materials, conductive additives, and current collector as well as to increase the volumetric energy density by adjusting the porosity.

The contemporary anode electrode is either graphite or hard carbon. Similar to the cathode, the anode binder is typically PVDF to bond the particles together and conductive additives such as carbon black are sometime added to the anode mix as well to improve power performance.

While graphite or carbon based anodes have established themselves as the anode of choice in current generation batteries, they do fall short of meeting the requirements for the next generation. This is mainly due to the lower energy density (375 mAh/g) of graphite and the fact that the state-of-the-art graphite is near its theoretical limit.

Hence there has been a lot of interest in the industry in exploring alternate anode materials that would have much higher energy density and enhanced safety while remaining low cost and retaining long cycle life. High capacity alloy anodes such as silicon and tin have been explored as potential replacements for graphite due to their large theoretical energy densities. However, these materials have not been transformed to high volume manufacturing. There are three main technical limitations that have deterred the adoption these advanced materials using conventional slurry based approaches.

First, the large volumetric stress that occurs in these alloy anodes during lithiation/delithiation leads to the pulverization of alloy anode particles resulting in poor cycle life. Second, the poor or unstable solid electrolyte interphase (SEI) layer formed on the surface leads to instability in performance and also to potential safety issues. Third, the first-cycle irreversible capacity loss is too high in these alloy anodes to be introduced to practical application.

One way to circumvent some of these issues, if not all, is to engineer particles that embed the alloy anodes in multiphase composites or by particle size engineering. These approaches, while moderately successful in mitigating the first cycle loss and extending the cycle life, fail to achieve desired gravimetric and volumetric energy densities due to the mass contribution from inactive components. Improvements in energy density, often if not always, result in a corresponding decline in power density.

Accordingly, there is a need in the art for faster charging, higher capacity energy storage devices that are smaller, lighter, and can be more cost effectively manufactured.

SUMMARY OF THE INVENTION

Embodiments of the present invention generally relate to high capacity energy storage device and energy storage device components, and more specifically, to a system and method for fabricating such high capacity energy storage devices and storage device components using processes that form three-dimensional porous structures. In one embodiment, an anode structure for use in a high capacity energy storage device, comprising a conductive collector substrate, a three-dimensional copper-tin-iron porous conductive matrix formed on one or more surfaces of the conductive collector substrate, comprising a plurality of meso-porous structures formed over the conductive current collector, and an anodically active material deposited over the three-dimensional copper-tin-iron porous conductive matrix is provided. In certain embodiments, the three-dimensional copper-tin-iron porous conductive matrix further comprises a plurality of columnar projections formed on the conductive current collector with the plurality of meso-porous structure formed on the plurality of columnar projections.

In another embodiment, a method of forming an anode structure for a high capacity energy storage device comprising forming a three-dimensional copper-tin-iron porous conductive matrix on one or more surfaces of a conductive collector substrate using an electroplating process and depositing an anodically active material over the three-dimensional copper-tin-iron porous conductive matrix is provided.

In yet another embodiment, a method of forming a porous three-dimensional electrode microstructure for an electrochemical cell, comprising positioning a current collector substrate in a plating solution, forming a three-dimensional copper-tin-iron porous conductive matrix on one or more surfaces of the conductive collector substrate using an electroplating process, comprising depositing a columnar metal layer over the substrate at a first current density by a diffusion limited deposition process and depositing porous conductive dendritic structures over the columnar metal layer at a second current density greater than the first current density and depositing an anodically active material over the three-dimensional copper-tin-iron porous conductive matrix, wherein the plating solution comprises a tin source, a copper source, and an iron source is provided.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A is a scanning electron microscope (SEM) image of a cross-section of a composite layer containing a three dimensional plated electrode structure with particles deposited thereon according to embodiments described herein; and FIG. 5B is a SEM image of an enlarged portion of the cross-section of the composite layer of FIG. 5A according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Certain embodiments described herein enhance the volumetric use efficiency of anode structures by depositing silicon and/or graphite on a core of a three-dimensional high porosity conductive matrix, for example, three-dimensional copper-tin-iron (CuSnFe) attached to a current collector (e.g., copper foil). It is believed that the electrical connection between the current collector and the three-dimensional CuSnFe conductive matrix and the high conductivity of the matrix enhance the power capability of the anode electrode. In certain embodiments where three-dimensional CuSnFe is the matrix for silicon, in addition to offering mechanical and electrochemical stability, the three-dimensional CuSnFe matrix allows for storage of lithium ions with very high loading.

Silicon is a good negative electrode candidate material for Li-ion batteries but the volume expansion and reaction with electrolyte of silicon are major drawbacks. While three-dimensional Cu can be engineered to cushion the volume expansion, in certain embodiments titanium dioxide ($TiO_2$) or aluminum oxide ($Al_2O_3$) may be used to form stable solid-electrolyte interphase (SEI) and prevent degradation of Si. Three-dimensional Cu, pre-deposited three-dimensional Cu with silicon deposited using CVD techniques or silicon deposited using electrostatic spray techniques provide starting materials. In certain embodiments, the pores of the three-dimensional Cu covered with Si are chemically treated with a suitable reagent such as titanium isopropoxide in form a thin film coating of the Si particles followed by a wet chemistry treatment to get oxide/hydroxide coating on the silicon surface within the pores of three-dimensional Cu. This metal oxide coated three-dimensional Cu with silicon may be heat treated under suitable atmospheric conditions to achieve better adhesion and also remove hydroxyl groups in the coated oxide. The titanium oxide or aluminum oxide may be applied using coating techniques such as spin coating, spray coating or electrostatic spray coating to achieve a uniform metal oxide surface coated on the three-dimensional Cu matrix on a current collector with silicon as a reversible Li-absorbing material. In certain embodiments, the silicon and/or graphite particles may be pre-coated with the titanium oxide or aluminum oxide prior to deposition.

Figure 1A:
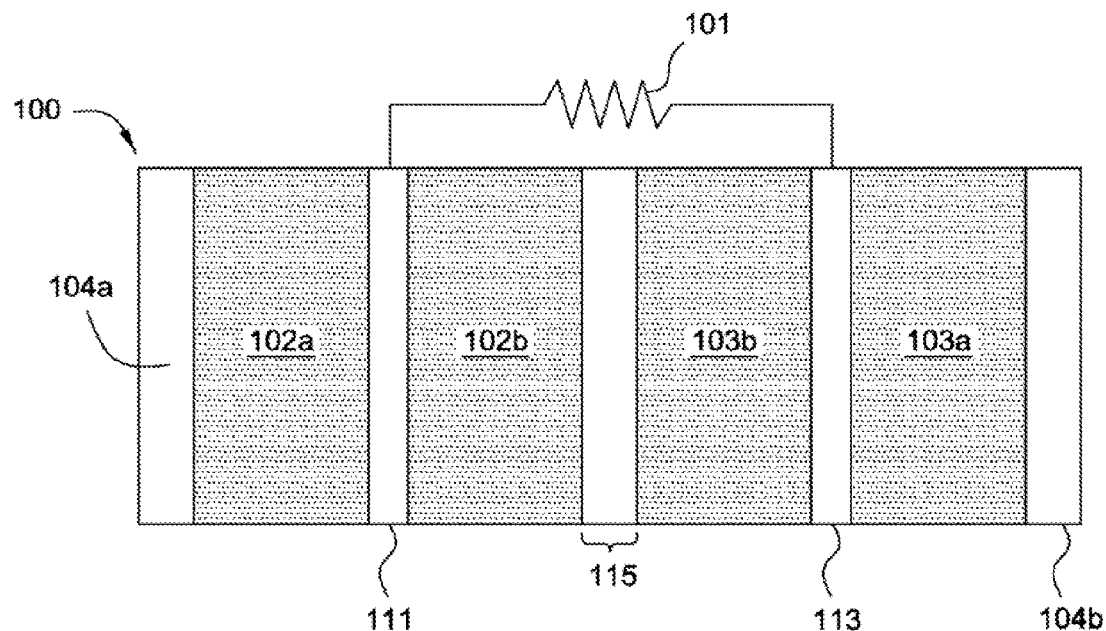
FIG. 1A is a schematic diagram of a partial Li-ion battery cell bi-layer with anode electrodes formed according to embodiments described herein.
Figure 1B:
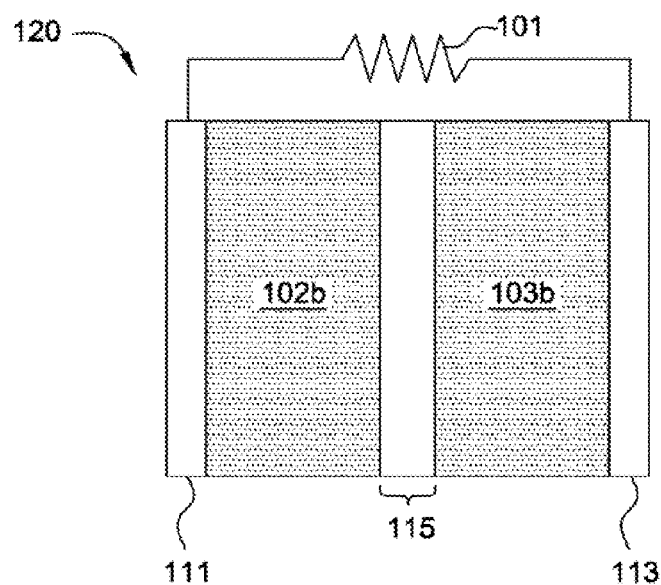
FIG. 1B is a schematic diagram of a partial Li-ion battery cell with an anode electrode formed according to embodiments described herein.

FIG. 1A is a schematic diagram of a partial Li-ion battery cell bi-layer 100 with anode structures 102a, 102b formed according to embodiments described herein. FIG. 1B is a schematic diagram of a partial Li-ion battery cell 120 with an anode structure 102b formed according to embodiments described herein. The Li-ion battery cells 100, 120 are electrically connected to a load 101, according to one embodiment described herein. The primary functional components of the Li-ion battery cell bi-layer 100 include the anode structures 102a, 102b, cathode structures 103a, 103b, separator layers 104a, 104b, 115, current collectors 111 and 113 and an electrolyte (not shown) disposed within the region between the separator layers 104a, 104b. The primary functional components of the Li-ion battery cell 120 include anode structure 102b, cathode structures 103b, separator 115, current collectors 111 and 113 and an electrolyte (not shown) disposed within the region between the current collectors 111, 113. A variety of materials may be used as the electrolyte, for example, a lithium salt in an organic solvent. The Li-ion battery cells 100, 120 may be hermetically sealed with electrolyte in a suitable package with leads for the current collectors 111 and 113. The anode structures 102a, 102b, cathode structures 103a, 103b, and fluid-permeable separator layers 104a, 104b, 115 are immersed in the electrolyte in the region formed between the separator layers 104a and 104b. It should be understood that a partial exemplary structure is shown and that in certain embodiments additional separator layers, anode structures, cathode structures, and current collectors may be added.

Anode structure 102b and cathode structure 103b serve as a half-cell of Li-ion battery cell 100. Anode structure 102b includes a metal anodic current collector 111 and a first electrolyte containing material, such as a carbon-based intercalation host material for retaining lithium ions. Similarly, cathode structure 103b includes a cathodic current collector 113 respectively and a second electrolyte containing material, such as a metal oxide, for retaining lithium ions. The current collectors 111 and 113 are made of electrically conductive material such as metals. In one embodiment, the anodic current collector 111 comprises copper and the cathodic current collector 113 comprises aluminum. The separator layer 115 is used to prevent direct electrical contact between the components in the anode structure 102b and the cathode structure 103b.

The electrolyte containing porous material in the cathode structure 103a, 103b side of the Li-ion battery cell 100, 120 or positive electrode may comprise a metal oxide or a lithium-containing metal oxide, such as lithium cobalt dioxide ($LiCoO_2$) or lithium manganese dioxide ($LiMnO_2$). The electrolyte containing porous material may be made from a layered oxide, such as lithium cobalt oxide, an olivine, such as lithium iron phosphate, or a spinel, such as lithium manganese oxide. In non-lithium embodiments, an exemplary cathode may be made from $TiS_2$ (titanium disulfide). Exemplary lithium-containing oxides may be layered, such as lithium cobalt oxide ($LiCoO_2$), or mixed metal oxides, such as $LiNi_xCo_{1-2x}MnO_2$, $LiNi_{0.5}Mn_{1.5}O_4$, $Li(Ni_{0.8}Co_{0.15}Al_{0.05})O_2$, $LiMn_2O_4$. Exemplary phosphates may be iron olivine ($LiFePO_4$) and it is variants (such as $LiFe_{1-x}MgPO_4$), $LiMoPO_4$, $LiCoPO_4$, $LiNiPO_4$, $Li_3V(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$. The cathode structure may comprise nickel-manganese-cobalt (NMC).

The electrolyte containing porous material in the anode structure 102a, 102b of the Li-ion battery cell 100, 120 or negative electrode, may be made from materials including copper, tin, iron, silicon, graphite, carbon, lithium and combinations thereof. Exemplary materials include graphitic particles dispersed in a polymer matrix and/or various fine powders, for example, micro-scale or nano-scale sized powders. Additionally, microbeads of silicon, tin, or lithium titanate ($Li_4Ti_5O_{12}$) may be used with, or instead of, graphitic microbeads to provide the conductive core anode material. It should also be understood that although a Li-ion battery cell bi-layer 100 is depicted in FIG. 1A, the embodiments described herein are not limited to Li-ion battery cell bi-layer structures. It should also be understood, that the anode and cathode structures may be connected either in series or in parallel.

Figure 2A:
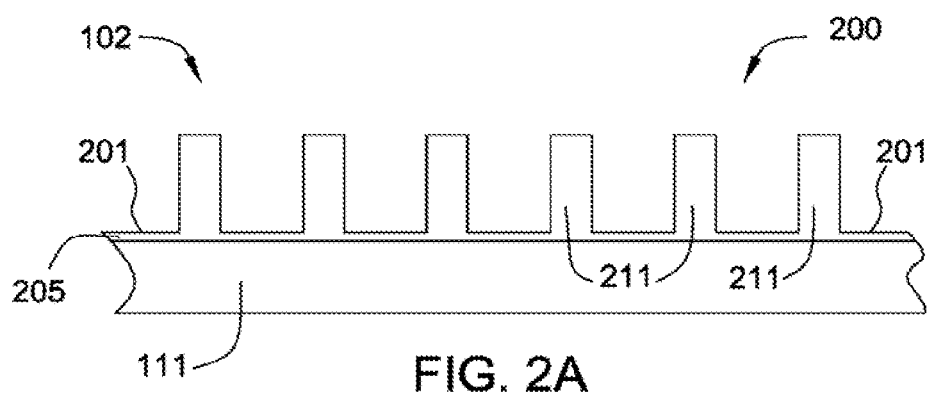
FIGS. 2A-2D are schematic cross-sectional views of an anode structure at various stages of formation, according to embodiments described herein.

FIGS. 2A-2D are schematic cross-sectional views of an anode structure 102a, 102b (collectively referred to as 102) at various stages of formation, according to embodiments described herein. In FIG. 2A, current collector 111 and a three-dimensional conductive matrix layer 202 is schematically illustrated prior to the deposition of an anodically active material 210. The three-dimensional conductive matrix layer 202 may be a copper containing conductive matrix layer. The three-dimensional conductive matrix layer 202 may be a three-dimensional CuSnFe conductive matrix or a three-dimensional CuSnFeLi conductive matrix. In one embodiment, current collector 111 is a conductive substrate (e.g., metallic foil, sheet, and plate) and may have an insulating coating disposed thereon. In one embodiment, the current collector 111 may include a relatively thin conductive layer disposed on a host substrate comprising one or more conductive materials, such as a metal, plastic, graphite, polymers, carbon-containing polymer, composites, or other suitable materials. Exemplary metals that current collector 111 may be comprised of include copper (Cu), zinc (Zn), nickel (Ni), cobalt (Co), palladium (Pd), platinum (Pt), tin (Sn), ruthenium (Ru), stainless steel, alloys thereof, and combinations thereof. In one embodiment, the current collector 111 is perforated.

Alternatively, current collector 111 may comprise a host substrate that is non-conductive, such as a glass, silicon, and plastic or polymeric substrate that has an electrically conductive layer formed thereon by means known in the art, including physical vapor deposition (PVD), electrochemical plating, electroless plating, and the like. In one embodiment, current collector 111 is formed out of a flexible host substrate. The flexible host substrate may be a lightweight and inexpensive plastic material, such as polyethylene, polypropylene or other suitable plastic or polymeric material, with a conductive layer formed thereon. In one embodiment, the conductive layer is between about 10 and 15 microns thick in order to minimize resistive loss. Materials suitable for use as such a flexible substrate include a polyimide (e.g., KAPTON™ by DuPont Corporation), polyethyleneterephthalate (PET), polyacrylates, polycarbonate, silicone, epoxy resins, silicone-functionalized epoxy resins, polyester (e.g., MYLAR™ by E.I. du Pont de Nemours & Co.), APICAL AV manufactured by Kanegaftigi Chemical Industry Company, UPILEX manufactured by UBE Industries, Ltd.; polyethersulfones (PES) manufactured by Sumitomo, a polyetherimide (e.g., ULTEM by General Electric Company), and polyethylenenaphthalene (PEN). Alternately, the flexible substrate may be constructed from a relatively thin glass that is reinforced with a polymeric coating.

As shown, current collector 111 has a three-dimensional conductive matrix layer 202 or "container layer" disposed on a surface 201 thereof. The three-dimensional conductive matrix layer 202 comprises conductive microstructures 200 with a meso-porous structure 212 formed thereon with pockets or wells 220 formed therebetween. In certain embodiments, the three-dimensional conductive matrix layer comprises a meso-porous structure 212 formed directly on the current collector 111 without conductive microstructures 200. In one embodiment, the three-dimensional conductive matrix layer 202 has a height between about 10 μm to about 200 μm, for example, between about 50 μm to about 100 μm. The conductive microstructures 200 greatly increase the effective surface area of current collector 111 and reduce the distance that charge must travel in the intercalation layer of anode structure 102 before entering current collector 111. Thus, the formation of conductive microstructures 200 on surface 201 reduces the charge/discharge time and internal resistance of an energy storage device that is configured with anode structure 102. In FIG. 2A, the conductive microstructures 200 are depicted schematically as rectangular projections, oriented perpendicular to surface 201. Different configurations of conductive microstructures 200 are contemplated by embodiments described herein. The conductive microstructures may comprise materials selected from the group comprising copper, tin, silicon, cobalt, titanium, iron, alloys thereof, and combinations thereof.

In one embodiment, conductive microstructures 200 are formed on current collector 111 as a three-dimensional, columnar growth of material by use of a high plating rate electroplating process performed at current densities above the limiting current ($i_L$). In this way, columnar projections 211 in the conductive microstructures 200 may be formed on surface 201. In the diffusion-limited electrochemical plating process by which conductive microstructures 200 are formed, the electroplating limiting current is met or exceeded, thereby producing a low-density metallic meso-porous/columnar structure on surface 201 rather than a conventional high-density conformal film. In another embodiment, the substrate may be roughened by chemically treating the surface of the substrate to increase the surface area, and/or patterned and etched using methods known in the art for patterning metallic films. In one embodiment, current collector 111 is a copper-containing foil or a substrate having a layer of copper-containing metal deposited thereon, and therefore has a copper or copper alloy surface. In such an embodiment, a copper electro-plating process may be used to form columnar projections 211. Columnar projections 211 may also be formed by performing electroplating processes on other surfaces besides the copper-containing surfaces. For example, surface 201 may include a surface layer of any other metal that may act as a catalytic surface for the subsequent formation of subsequent material, such as silver (Ag), iron (Fe), nickel (Ni), cobalt (Co), palladium (Pd), and platinum (Pt), among others.

To aid in the electrochemical deposition of columnar projections 211, current collector 111 may include a conductive seed layer 205 that has been deposited thereon. Conductive seed layer 205 preferably comprises a copper seed layer or alloys thereof. Other metals, particularly noble metals, may also be used for conductive seed layer 205. Conductive seed layer 205 may be deposited on current collector 111 by techniques well known in the art, including physical vapor deposition (PVD), chemical vapor deposition (CVD), thermal evaporation, and electroless deposition techniques, among others. Alternatively, columnar projections 211 may be formed by an electrochemical plating process directly on current collector 111, i.e., without conductive seed layer 205.

Figure 2B:
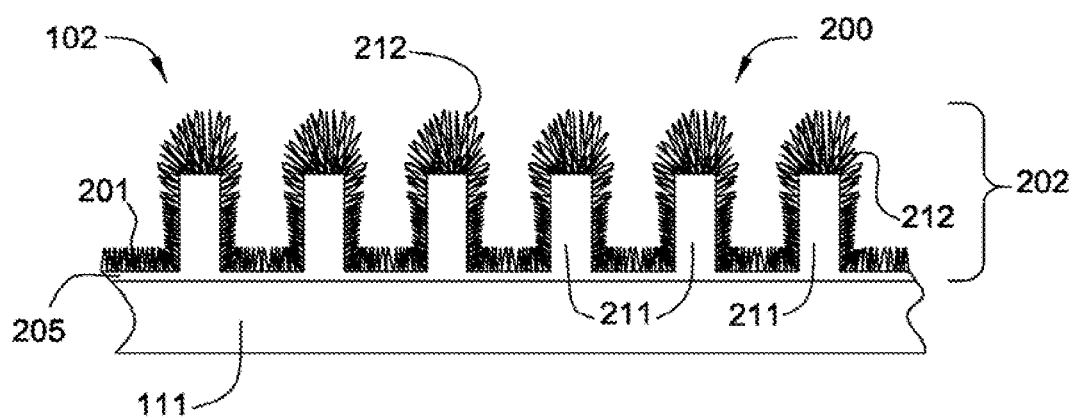

FIG. 2B schematically illustrates the three-dimensional conductive microstructures 200 including meso-porous structures 212 formed over columnar projections 211, according to an embodiment of the invention. As previously described, the meso-porous structure 212 may be formed directly on the surface of the current collector 111. In one embodiment, the meso-porous structures 212 are high-surface-area, meso-porous structures comprised of a plated metal or metal alloy. In one embodiment, meso-porous structures 212 are formed by an electrochemical plating process in which the over potential, or applied voltage used to form the meso-porous structures 212 is significantly greater than that used to form the columnar projections 211, thereby producing a three-dimensional, low-density metallic meso-porous structure on columnar projections 211 or directly on the surface of the current collector 111. In another embodiment, meso-porous structures 212 are formed by an electroless plating process. Meso-porous structures 212 have been demonstrated to increase the conductive surface area of current collector 111 significantly more than columnar projections 211 alone. In one embodiment, the meso-porous structures 212 may increase the conductive surface area of current collector 111 by a factor of 10 to 100.

In certain embodiments, the conductive microstructures 200 comprise an additional layer formed over the meso-porous structures 212 and the columnar projections 211, for example, a tin layer. This additional layer can be formed by an electrochemical plating process. The additional layer provides high capacity and long cycle life for the electrode to be formed. In one embodiment, the meso-porous structures 212 and the columnar projections 211 comprise a copper-tin-iron alloy and the additional layer comprises tin.

In certain embodiments, it may be desirable to plate tin particles onto the current collector 111. In certain embodiments, tin particles are plated into the three-dimensional conductive microstructures 200. For example, tin nanoparticles may be plated into the columnar projections 211 and/or the meso-porous structures 212 and large tin particles may be plated into the middle of the conductive microstructures 200. In certain embodiments, tin particles are plated into a three-dimensional copper-tin-iron alloy. It has been found that the embedding of tin into the three-dimensional conductive microstructures increases the density of active material present in the three-dimensional conductive structure.

Figure 2C:
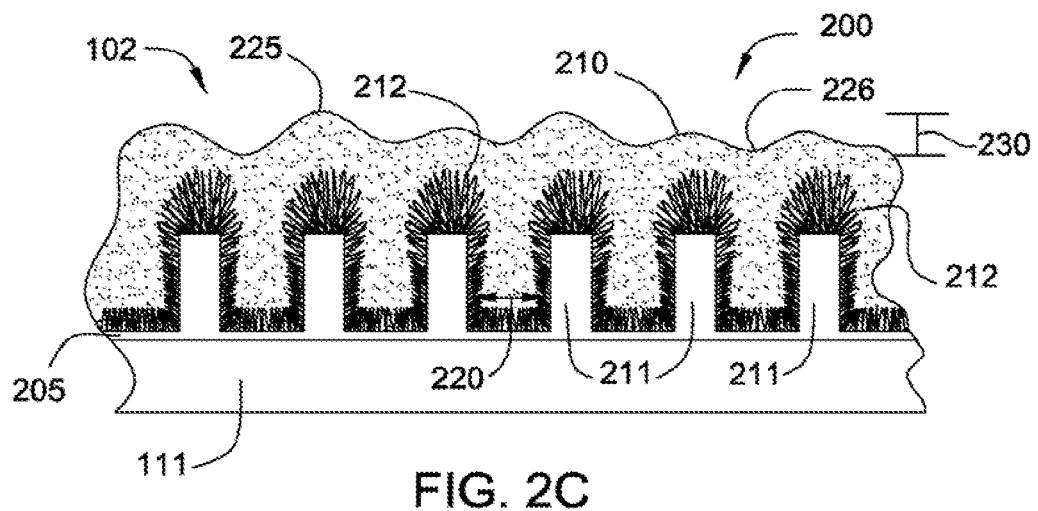

FIG. 2C illustrates the current collector 111 three-dimensional conductive matrix layer 202 after the deposition of an anodically active material 210 into the plurality of pockets 220 formed by the three-dimensional conductive microstructures 200, according to embodiments described herein. In one embodiment, the anodically active material 210 is selected from the group comprising graphite, graphene hard carbon, carbon black, carbon coated silicon, tin particles, tin oxide, silicon carbide, silicon (amorphous or crystalline), silicon alloys, doped silicon, lithium titanate, any other appropriately electro-active powder, composites thereof and combinations thereof. Lithium containing materials may be deposited over the three dimensional conductive microstructures. Exemplary lithium materials include stabilized lithium metal powder (SLMP®), commercially available from FMC Corporation. Spray application of SLMP® has been found to reduce Irreversible Capacity Loss (ICL). The lithium containing materials may be co-deposited with the anodically active material or deposited in a separate step. In one embodiment, the anodically active material comprises nano-scale particles. The anodically active material 210 may be coated. In one embodiment, the nano-scale particles have a diameter between about 1 nm and about 100 nm. In one embodiment, the particles of the powder are micro-scale particles. In one embodiment, the particles of the powder include aggregated micro-scale particles. In one embodiment, the micro-scale particles have a diameter between about 2 μm and about 15 μm.

In certain embodiments, a precursor used to facilitate binding of the powder with the substrate is blended with the anodically active material 210 prior to deposition on the substrate. The precursor may comprise a binding agent, such as a polymer, to hold the powder on the surface of the substrate. The binding agent may have some electrical conductivity to avoid diminishing the performance of the deposited layer. In one embodiment, the binding agent is a carbon containing polymer having a low molecular weight. The low molecular weight polymer may have a number average molecular weight of less than about 10,000 to promote adhesion of the nanoparticles to the substrate. Exemplary binding agents include, but are not limited to, polyvinylidene difluoride (PVDF), carboxymethyl cellulose (CMC), and water-soluble binders, such as styrene butadiene rubber (SBR) and polyacrylic alcohol (PAA).

In one embodiment, the anodically active material 210 may be applied by either wet or dry deposition techniques. Whether the majority of anodically active material 210 is deposited over or into the pockets 220 is dependent upon a number of factors which may be modified to achieve desired deposition including the size of the pockets 220, the size of the anodically active material 210, the type of application technique used, and the process conditions of the application technique used. In one embodiment, the anodically active material may be applied using deposition techniques including but not limited to sifting techniques, spray deposition techniques, fluidized bed coating techniques, slit coating techniques, roll coating techniques, and combinations thereof, all of which are known to those skilled in the art. Exemplary spray deposition techniques include hydraulic spray techniques, atomizing spray techniques, electrostatic spray techniques, plasma spray techniques, and thermal or flame spray techniques. The anodically active material may be applied using a multi-step deposition process.

In one embodiment, as shown in FIG. 2C, after deposition of the anodically active material 210 over and/or into the pockets 220, there is an amount of overfill 230 extending above an upper surface of the conductive microstructure 200. The overfill 230 may comprise a series of peaks 225 and troughs 226 on the surface of the anodically active material 210. In one embodiment, the overfill 230 extends between about 2 μm and about 5 μm above the upper surface of the conductive microstructure 200. In certain embodiments, it may be desirable to overfill the pockets 220 with anodically active material 210 to achieve a desired net density of anodically active material 210 after compression of the powder. Although shown as overfill, it should also be understood that in certain embodiments it may be desirable to underfill the pockets 220 with powder. In certain embodiments, underfilling of the pocket 220 with anodically active material 210 may be desirable to accommodate electrochemical expansion of the anodically active material 210. In certain embodiments, the pocket 220 may be filled with anodically active material 210 to a level substantially even with the upper surface of the conductive microstructure 200.

As described below with reference to FIG. 2D, after the anodically active material 210 is deposited over the pockets 220, the anodically active material 210 may be compressed using compression techniques, for example, a calendering process, to achieve a desired net density of compacted powder while planarizing the powder that extends above the upper surface of the conductive microstructure. The anodically active material 210 and three-dimensional conductive microstructures may be heated during the compression process. In certain embodiments, the three-dimensional conductive matrix layer 202 may be compressed.

In general, an anode structure 102 that has conductive microstructures 200 including columnar projections 211 and/or meso-porous structures 212 formed thereon will have a surface that has one or more forms of porosity formed thereon. In one embodiment, the surface of the anode structure 102 comprises a macro-porosity structure wherein the pockets 220 are a plurality of macro-pores. In one embodiment, the pockets 220 are about 100 microns or less in size. It is believed that the size and density of the pockets 220 in the layer can be controlled by controlling the electroplating current density, surface tension of the electrolyte relative to the surface of the substrate, metal-ion concentration in the bath, roughness of the substrate surface, and the fluid dynamic flow. In embodiments where an embossing process is used to form the columnar projections 211, the size and density of the pockets 220 may be controlled by, for example, controlling the size of the matched male and female roller dies. In an embossing process, the shapes of the pockets 220 may be controlled by modifying the shapes of the male and female roller dies. In one embodiment, the pockets 220 are sized within a range between about 5 and about 100 microns (μm). In another embodiment, the average size of the pockets 220 is about 30 microns in size. In certain embodiments, the pockets 220 have a depth between about 20 microns to about 100 microns. In certain embodiments, the pockets 220 have a depth between about 30 microns to about 50 microns. In certain embodiments, the pockets 220 have a diameter from about 10 microns to about 80 microns. In certain embodiments, the pockets 220 have a diameter from about 30 microns to about 50 microns. The surface of the anode structure may also comprise a second type, or class, of pore structures or pockets 220 that are formed between the columnar projections 211 and/or main central bodies of the dendrites, which is known as meso-porosity, wherein the pockets 220 include a plurality of meso-pores. The meso-porosity may comprise a plurality of meso-pores that are less than about 1 micron in size. In another embodiment, the meso-porosity may comprise a plurality of meso-pores that are between about 100 nm to about 1,000 nm in size. In one embodiment, the meso-pores are between about 20 nm to about 100 nm in size. Additionally, the surface of the anode structure 102 may also comprise a third type, or class, of pore structures that are formed between the dendrites, which is known as nano-porosity. In one embodiment, the nano-porosity may comprise a plurality of nano-pores or pockets 220 that is sized less than about 100 nm. In another embodiment, the nano-porosity may comprise a plurality of nano-pores that are less than about 20 nm in size.

Figure 2D:
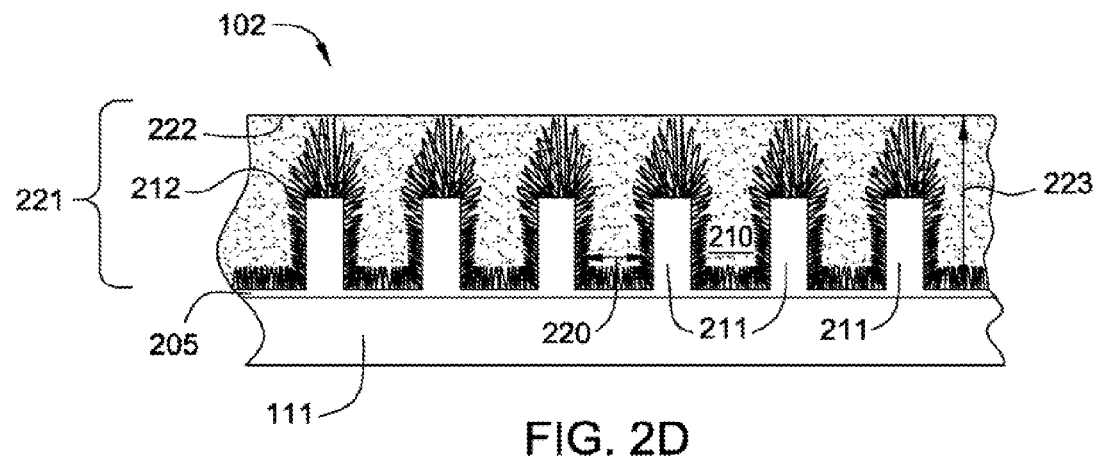

FIG. 2D illustrates the current collector 111 and three-dimensional porous conductive matrix layer 202 after compression of the anodically active material 210 into the plurality of pockets 220 formed by the conductive microstructures 200, according to embodiments described herein. After deposition of the anodically active material 210 to fill pockets 220, compression of the anodically active material 210 forms a layer 221 on the conductive microstructures 200 having a substantially planar surface 222. The substantially planar surface 222 results by compression of anodically active material 210 to reduce peaks 225 and troughs 226 apparent in FIG. 2C. Referring to FIG. 2D, the thickness 223 of layer 221 is variable depending on the intercalation layer requirements of the energy storage device that contains anode structure 102. For example, in a Li-ion battery, the anodically active material 210 can serve as an intercalation layer for lithium ions within the anode structure 102. In such an embodiment, a greater thickness 223 of layer 221 results in a greater energy storage capacity for the battery cell 100, but also a greater distance for the charge to travel before entering current collector 111, which can slow charge/discharge times and increase internal resistance. Consequently, thickness 223 of layer 221 may range from between about 10 μm to about 200 μm, for example, between about 50 μm to about 100 μm, depending on the desired functionality of the battery cell 100. The anodically active material 210 may be compressed using compression techniques known in the art, for example, calendering.

Figure 3:
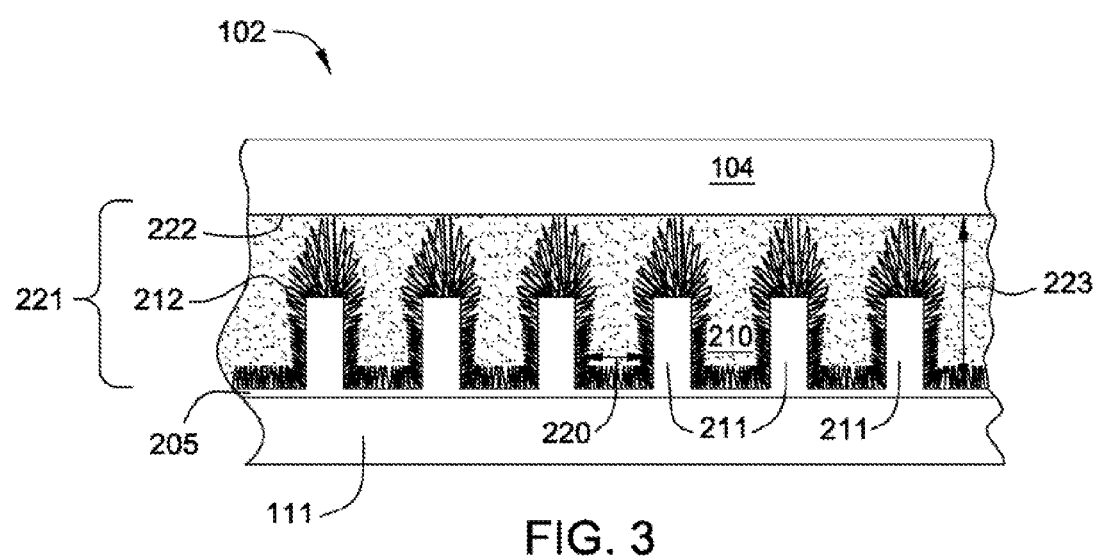
FIG. 3 illustrates an anode structure after the formation of a separator layer over an anode structure formed according to embodiments described herein.

FIG. 3 illustrates an anode structure 102 after the formation of a separator layer 104 over a layer 221 comprising conductive microstructures 200 and compressed anodically active material 210, according to embodiments of the invention. In one embodiment, the separator layer 104 is a dielectric, porous layer that separates anode structure 102 from cathode structure 103. The porous nature of separator layer 104 allows ions to travel between the first electrolyte containing material, anodically active material 210 of anode structure 102 and the second electrolyte containing structure of cathode structure 103 via the liquid portion of the electrolyte contained in the pores of separator layer 104.

Figure 4:
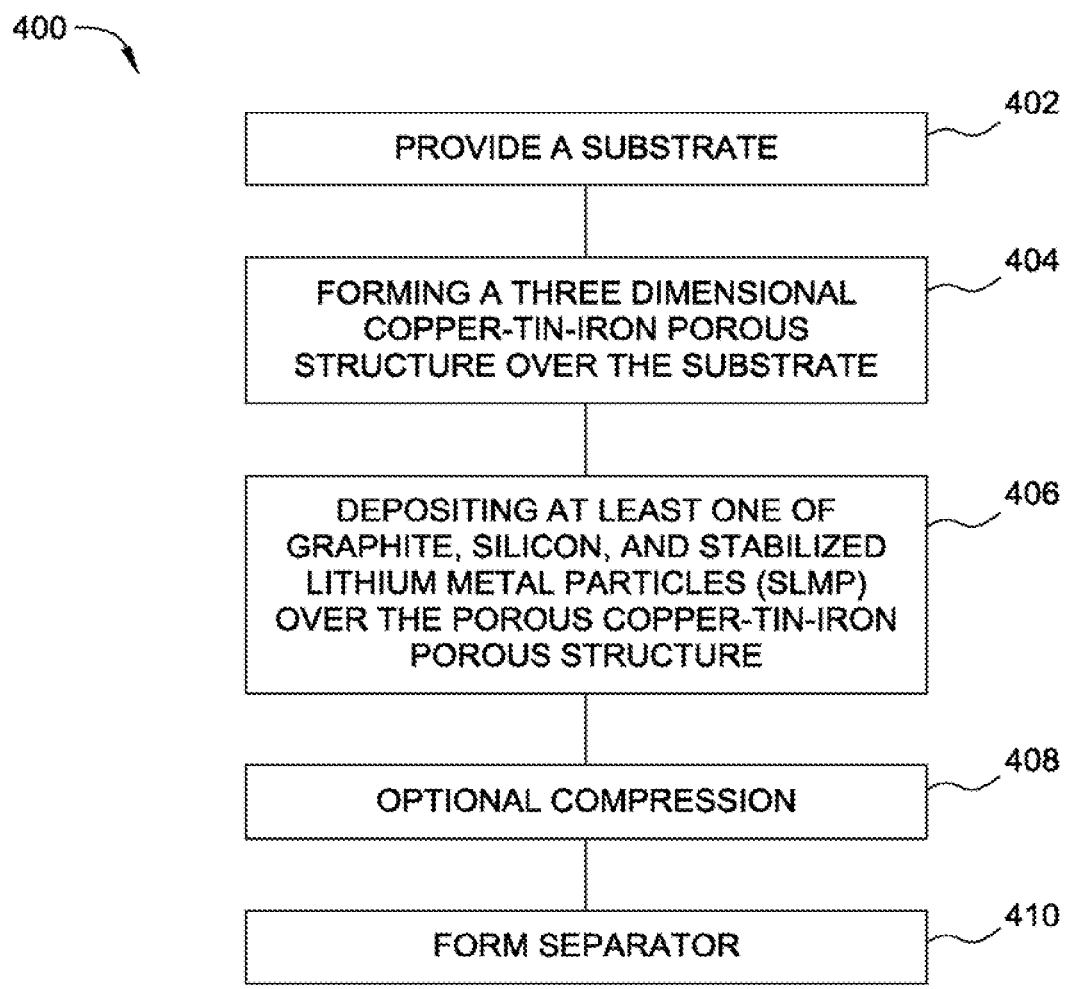
FIG. 4 is a process flow chart summarizing one embodiment of a method for forming a cathode structure according to embodiments described herein.

FIG. 4 is a process flow chart summarizing one embodiment of a method 400 for forming an electrode structure similar to anode structure 102 as illustrated in FIGS. 1 and 2A-2F, according to embodiments described herein. In block 402, a substrate substantially similar to current collector 111 in FIG. 1 is provided. As detailed above, the substrate may be a conductive substrate, such as metallic foil, or a non-conductive substrate that has an electrically conductive layer formed thereon, such as a flexible polymer or plastic having a metallic coating. The current collector 111 may be a pre-formed current collector. The current collector 111 may be formed by an electrodeposition process such as an electroplating process. The current collector 111 may have a thickness between about 1 micron and about 50 microns. The current collector 111 may have a thickness between about 4 microns and about 10 microns. The current collector may have a thickness of about 4 microns or less, for example, between about 2 and about 4 microns thick.

At block 404, a three-dimensional copper-containing conductive microstructure having pockets similar to conductive microstructure 200 is deposited over the current collector 111. The three-dimensional conductive micro-structure may be formed using a plating process, an embossing process, a nano-imprinting process, a wire mesh, or combinations thereof. The three-dimensional conductive microstructure may have a thickness of about 50 microns. The three-dimensional copper-containing conductive microstructure may be a copper-tin-iron conductive microstructure. The three-dimensional copper-containing conductive microstructure may be a copper-tin-iron-lithium conductive microstructure.

In embodiments where a plating process is used to form the conductive microstructure, columnar projections similar to conductive columnar projections 211 in FIG. 2B are formed on a conductive surface of the current collector 111. In one embodiment, the columnar projections 211 may have a height of 5 to 10 microns and/or have a measured surface roughness of about 10 microns. In another embodiment, the columnar projections 211 may have a height of 15 to 30 microns and/or have a measured surface roughness of about 20 microns. In one embodiment, a diffusion-limited electrochemical plating process is used to form the columnar projections 211. In one embodiment, the three-dimensional growth of the columnar projections 211 is performed using a high plating rate electroplating process performed at current densities above the limiting current ($i_L$). Formation of the columnar projections 211 includes establishing process conditions under which evolution of hydrogen results, thereby forming a porous metal film. In one embodiment, such process conditions are achieved by performing at least one of: decreasing the concentration of metal ions near the surface of the plating process; increasing the diffusion boundary layer; and reducing the organic additive concentration in the electrolyte bath. It should be noted that the diffusion boundary layer is strongly related to the hydrodynamic conditions. If the metal ion concentration is too low and/or the diffusion boundary layer is too large at a desired plating rate, the limiting current ($i_L$) will be reached. The diffusion-limited plating process created when the limiting current is reached forms the increase in plating rate by the application of more voltage to the surface of the plating process, e.g., a seed layer surface on current collector 111. When the limiting current is reached, low density columnar projections, i.e., columnar projections 211, are produced due to the evolution of gas and resulting meso-porous type film growth that occurs due to the mass-transport-limited process.

Suitable Plating Solutions:

Suitable plating solutions that may be used with the processes described herein include electrolyte solutions containing a metal ion source, an acid solution, and optional additives.

In one embodiment, to increase planarization power, the plating solution used in block 404 contains at least one or more acid solutions. Suitable acid solutions include, for example, inorganic acids such as sulfuric acid, phosphoric acid, pyrophosphoric acid, perchloric acid, acetic acid, citric acid, combinations thereof, as well as acid electrolyte derivatives, including ammonium and potassium salts thereof.

Optionally, the plating solution may include one or more additive compounds. Additive compounds include electrolyte additives including, but not limited to, suppressors, enhancers, levelers, brighteners and stabilizers to improve the effectiveness of the plating solution for depositing metal, namely copper to the substrate surface. For example, certain additives may be used to control the mechanism of bubble formation. Certain additives may decrease the ionization rate of the metal atoms, thereby inhibiting the dissolution process, whereas other additives may provide a finished, shiny substrate surface. The additives may be present in the plating solution in concentrations up to about 15% by weight or volume, and may vary based upon the desired result after plating. Optional additives include polyethylene glycol (PEG), polyethylene glycol derivatives, polyamides, polyimides including polyethyleneimide, polyglycine, 2-amino-1-napthalenesulfonic acid, 3-amino-1-propane-sulfonic acid, 4-aminotoluene-2-sulfonic acid, polyacrylamide, polyacrylic acid polymers, polycarboxylate copolymers, coconut diethanolamide, oleic diethanolamide, ethanolamide derivatives, sulfur containing compounds such as sulfite or di-sulfite, and combinations thereof.

In one embodiment, the metal ion source within the plating solution used in block 404 is a copper ion source. In one embodiment, the concentration of copper ions in the electrolyte may range from about 0.1 M to about 1.1 M, preferably from about 0.4 M to about 0.9 M. Useful copper sources include copper sulfate ($CuSO_4$), copper chloride ($CuCl_2$), copper acetate ($Cu(CO_2CH_3)_2$), copper pyrophosphate ($Cu_2P_2O_7$), copper fluoroborate ($Cu(BF_4)_2$), derivatives thereof, hydrates thereof or combinations thereof. The electrolyte composition can also be based on the alkaline copper plating baths (e.g., cyanide, glycerin, ammonia, etc) as well.

In one embodiment, it may be desirable to add additional metal ion sources to the primary metal ion containing electrolyte bath (e.g., copper ion containing bath) that will plate out or be incorporated in the growing electrochemically deposited layer or on the grain boundaries of the electrochemically deposited layer. The formation of a metal layer that contains a percentage of a second element can be useful to reduce the intrinsic stress of the formed layer and/or improve its electrical and electromigration properties. In one example, it is desirable to add an amount of silver (Ag), nickel (Ni), zinc (Zn), tin (Sn), iron (Fe) or lithium (Li) metal ion source to a copper plating bath. The formed copper alloy may have between about 1% and about 4% of the additional metal sources in the deposited layer.

In one example, the additional metal ion source within the electrolyte solution used in block 404 is at least one of a silver, tin, zinc, nickel or iron ion source. In one embodiment, the concentration of silver, tin, zinc, iron or nickel ions in the electrolyte may range from about 0.1 M to about 0.4 M, for example, between about 0.1 M to about 0.2M. Useful nickel sources include nickel sulfate, nickel chloride, nickel acetate, nickel phosphate, derivatives thereof, hydrates thereof or combinations thereof.

Examples of suitable tin sources include soluble tin compounds. A soluble tin compound can be a stannic or stannous salt. The stannic or stannous salt can be a sulfate, an alkane sulfonate, or an alkanol sulfonate. For example, the bath soluble tin compound can be one or more stannous alkane sulfonates of the formula:

where R is an alkyl group that includes from one to twelve carbon atoms. The stannous alkane sulfonate can be stannous methane sulfonate with the formula:

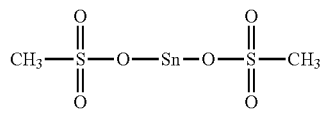

The bath soluble tin compound can also be stannous sulfate of the formula: $SnSO_4$.

Examples of the soluble tin compound can also include tin(II) salts of organic sulfonic acid such as methanesulfonic acid, ethanesulfonic acid, 2-propanolsulfonic acid, p-phenolsulfonic acid and like, tin(II) borofluoride, tin(II) sulfosuccinate, tin(II) sulfate, tin(II) oxide, tin(II) chloride and the like. These soluble tin(II) compounds may be used alone or in combination of two or more kinds.

Example of suitable cobalt sources may include cobalt salt selected from cobalt sulfate, cobalt nitrate, cobalt chloride, cobalt bromide, cobalt carbonate, cobalt acetate, ethylene diamine tetraacetic acid cobalt, cobalt (II) acetyl acetonate, cobalt (III) acetyl acetonate, glycine cobalt (III), and cobalt pyrophosphate, or combinations thereof.

Examples of suitable iron sources include iron salts selected from iron (II) bromide, iron (II) chloride, iron (III) chloride, iron (III) citrate, iron (II) fluoride, iron (III) fluoride, iron (II) iodide, iron (II) molybdate, iron (III) nitrate, iron (II) oxalate, iron (III) oxalate, iron (II) perchlorate, iron (III) phosphate, iron (III) pyrophosphate, iron (II) sulfate, iron (III) sulfate, iron (II) tetrafluoroborate, hydrates thereof, anhydrates thereof, and combinations thereof.

Examples of suitable lithium sources include lithium powders and lithium containing precursors. Exemplary lithium containing precursors are selected from the group comprising: $LiH_2PO_4$, LiOH, $LiNO_3$, $LiCH_3COO$, LiCl, $Li_2SO4$, $Li_3PO4$, $Li(C_5H_8O_2)$, and combinations thereof.

In one embodiment, the plating solution contains free copper ions in place of copper source compounds and complexed copper ions.

The columnar projections 211 is formed using a diffusion limited deposition process. The current densities of the deposition bias are selected such that the current densities are above the limiting current ($i_L$). When the limiting current is reached the columnar metal film is formed due to the evolution of hydrogen gas and resulting dendritic type film growth that occurs due to the mass transport limited process. During formation of the columnar metal layer, the deposition bias generally has a current density of about 10 A/cm² or less, preferably about 5 A/cm² or less, more preferably at about 3 A/cm² or less. In one embodiment, the deposition bias has a current density in the range from about 0.05 A/cm² to about 3.0 A/cm². In another embodiment, the deposition bias has a current density between about 0.1 A/cm² and about 0.5 A/cm².

The columnar projections 211 are formed using a diffusion limited deposition process. The current densities of the deposition bias are selected such that the current densities are above the limiting current ($i_L$). The columnar metal film is formed due to the evolution of hydrogen gas and resulting meso-porous film growth that occurs due to the mass transport limited process. In one embodiment, during formation of columnar projections 211, the deposition bias generally has a current density of about 5 A/cm² or less. In another embodiment, during formation of columnar projections 211, the deposition bias generally has a current density of about 3 A/cm² or less. In yet another embodiment, during formation of columnar projections 211, the deposition bias generally has a current density of about 2 A/cm² or less. In one embodiment, the deposition bias has a current density in the range from about 0.05 A/cm² to about 3.0 A/cm². In another embodiment, the deposition bias has a current density between about 0.1 A/cm² and about 0.5 A/cm². In yet another embodiment, the deposition bias has a current density between about 0.05 A/cm² and about 0.3 A/cm². In yet another embodiment, the deposition bias has a current density between about 0.05 A/cm² and about 0.2 A/cm². In one embodiment, this results in the formation of columnar projections between about 1 micron and about 300 microns thick on the copper seed layer. In another embodiment, this results in the formation of columnar projections between about 10 microns and about 30 microns. In yet another embodiment, this results in the formation of columnar projections between about 30 microns and about 100 microns. In yet another embodiment, this results in the formation of columnar projections between about 1 micron and about 10 microns, for example, about 5 microns.

In certain embodiments, a conductive meso-porous structure substantially similar to meso-porous structure 212 in FIG. 2B is formed on the substrate or current collector 111. The conductive meso-porous structures may be formed on the columnar projections 211, or formed directly on the flat conductive surface of the substrate or current collector 111. In one embodiment, an electrochemical plating process may be used to form the conductive meso-porous structures.

The electrochemical plating process for forming conductive meso-porous structures similar to meso-porous structures 212 involves exceeding the electroplating limiting current during plating to produce an even lower-density meso-porous structure than columnar projections 211. Otherwise, the process is substantially similar to the electroplating process for forming columnar projections 211 and may be performed in-situ. The electric potential spike at the cathode during this step is generally large enough so that reduction reactions occur, hydrogen gas bubbles form as a byproduct of the reduction reactions at the cathode, while meso-porous structures are constantly being formed on the exposed surfaces. The formed dendrites grow around the formed hydrogen bubbles because there is no electrolyte-electrode contact underneath the bubble. Consequently, these anodes have many pores when deposited according to embodiments described herein.

In sum, when an electrochemical plating process is used to form meso-porous structures 212 on columnar projections 211, a three-dimensional conductive microstructure may be formed at a first current density by a diffusion limited deposition process, followed by the three-dimensional growth of meso-porous structures 212 at a second current density, or second applied voltage, that is greater than the first current density, or first applied voltage.

The three-dimensional conductive microstructure may be may be exposed to an optional drying process in order to remove residual plating solution or rinsate remaining on the three-dimensional conductive microstructure. The drying process may be performed as part of the plating process or may be performed in a separate step. Drying processes which may be used include but are not limited to air drying process, an infrared drying process, or contacting the three-dimensional conductive microstructure with an absorbent material to remove excess liquid from the structure. Exemplary absorbent materials include blotting paper, fabrics, cloths, and felts. The absorbent material may be in the form of a roll.

At block 406 an anodically active material, similar to anodically active material 210 is deposited over the three-dimensional structure having pockets. Deposition of the anodically active material 210 may comprise depositing at least one of graphite, silicon, and stabilized lithium metal particles (SLPM), over the porous copper-tin-iron structure. In one embodiment, the anodically active material comprises particles selected from the group comprising graphite, graphene hard carbon, carbon black, carbon coated silicon, tin particles, tin oxide, silicon carbide, silicon (amorphous or crystalline), silicon carbonate, silicon graphite, silicon alloys, p-doped silicon, lithium titanate, any other appropriately electro-active materials, composites thereof and combinations thereof. In one embodiment, the anodically active material using deposition techniques including but not limited to sifting techniques, spray deposition techniques, fluidized bed coating techniques, slit coating techniques, roll coating techniques, chemical vapor deposition (CVD) techniques and combinations thereof, all of which are known to those skilled in the art. Exemplary spray deposition techniques include hydraulic spray techniques, atomizing spray techniques, electrostatic spray techniques, plasma spray techniques, and thermal or flame spray techniques. The anodically active material may be applied using a multi-step deposition process.

Optionally, a binding agent may be applied to the flexible conductive substrate. The binding agent may be applied in simultaneously with the anodically active material. The binding agent may be applied separately using techniques similar to the techniques for application of the anodically active material.

Optionally, the conductive microstructure with the as-deposited anodically active material may be exposed to an optional drying process in order to accelerate drying of the anodically active material in embodiments where wet application techniques are used. Drying processes which may be used include but are not limited to air drying process, an infrared drying process, or contacting the three-dimensional conductive microstructure with an absorbent material to remove excess liquid from the structure.

At block 408, the conductive microstructure with the anodically active material deposited thereon may be exposed to an optional compression process to compress the powder to achieve a desired net density of the anodically active material. Compression processes which may be used include but are not limited to calendering. Heat may be applied to the conductive microstructure with the anodically active material deposited thereon. The conductive microstructure may be heated to a temperature range from about 100° C. to about 250° C., for example, between about 150° C. and about 190° C.

In certain embodiments, the compression process reduces the thickness of the conductive microstructure and the anodically active material by about 30% to about 50% of the initial thickness. The initial porosity of the three-dimensional conductive microstructure with the anodically active material deposited thereon may be from about 30% to about 50% porosity relative to a solid structure formed from the same materials. After the compression process, the porosity may be reduced to between about 20% to about 30% relative to a solid structure formed from the same material.

At block 410, a separator layer is formed. The separator layer is a dielectric, porous, fluid-permeable layer that prevents direct electrical contact between the components in the anode structure and the cathode structure. The separator layer may be a pre-formed separator. The separator layer may be formed directly on the surface of the three-dimensional conductive microstructure and anodically active material. The separator may be formed using electrospinning techniques, electrostatic spraying techniques, or combinations thereof. Exemplary materials for the separator layer include polymers such as polyvinyl alcohol, polyolefin, polypropylene, polyethylene, and combinations thereof.

EXAMPLES

The following hypothetical non-limiting examples are provided to further illustrate embodiments described herein. However, the examples are not intended to be all inclusive and are not intended to limit the scope of the embodiments described herein.

Example #1

A substrate was placed in an electroplating chamber comprising a Pt(Ti) anode with a surface area of about 25 $cm^2$. A three-dimensional porous copper-tin-iron electrode was formed in a plating solution initially comprising 1.0 M sulfuric acid, 0.28 M copper sulfate, 0.15 M stannous sulfate, 0.1 M iron chloride and 200 ppm of citric acid. Three-dimensional copper-tin-iron alloy porous dendritic structures were deposited on the copper foil at a current density of about 1.0 $A/cm^2$. The process was performed at room temperature. Silicon-graphite was deposited over the three-dimensional copper-tin-iron dendritic structure using an electrostatic spray process. The anode structure was calendered to achieve a final porosity of about 30%.

Example #2

A substrate was placed in an electroplating chamber comprising a Pt(Ti) anode with a surface area of about 5×5 $cm^2$. A three-dimensional porous copper-tin-iron electrode was formed in a plating solution initially comprising 1.0 M sulfuric acid, 0.28 M copper sulfate, 0.15 M stannous sulfate, 0.1 M iron chloride and 200 ppm of citric acid. A columnar copper-tin-iron alloy structure was deposited at a current density of about 0.1 $A/cm^2$. Three-dimensional copper-tin-iron alloy porous dendritic structures were deposited on the columnar copper-tin alloy structure at a current density of about 1.0 $A/cm^2$. The process was performed at room temperature. Silicon-graphite was deposited over the three-dimensional copper-tin-iron dendritic structure using an electrostatic spray process. The anode structure was calendered to achieve a final porosity of about 30%.

Example #3

A substrate was placed in an electroplating chamber comprising a Pt(Ti) anode with a surface area of about 30×30 cm². A three-dimensional copper-tin-iron porous electrode structure was formed in a plating solution initially comprising 1.0 M sulfuric acid, 0.28 M copper sulfate, 0.23 M stannous sulfate, 0.1 M iron chloride and 200 ppm of citric acid. Three-dimensional porous copper-tin-iron structures were deposited on the copper-foil at a current density of about 1.0 A/cm². The process was performed at room temperature. Silicon-graphite was deposited over the three-dimensional copper-tin-iron dendritic structure using an electrostatic spray process. The anode structure was calendered to achieve a final porosity of about 30%.

Example #4

A substrate was placed in an electroplating chamber comprising a Pt(Ti) anode with a surface area of about 30×30 cm². A three-dimensional copper-tin-iron porous electrode structure was formed in a plating solution initially comprising 1.0 M sulfuric acid, 0.28 M copper sulfate, 0.23 M stannous sulfate, 0.1 M iron chloride, 0.1 M lithium chloride and 200 ppm of citric acid. A columnar copper-tin-iron structure was deposited at a current density of about 0.2 A/cm². Three-dimensional porous copper-tin-iron-lithium structures were deposited on the columnar copper-tin structure at a current density of about 1.0 A/cm². The process was performed at room temperature. Silicon-graphite was deposited over the three-dimensional copper-tin-iron-lithium dendritic structure using an electrostatic spray process. The anode structure was calendered to achieve a final porosity of about 30%.

Example #5

A substrate was placed in an electroplating chamber comprising a Pt(Ti) anode with a surface area of about 25 cm². A three-dimensional porous copper-tin-iron-lithium electrode structure was formed in a plating solution initially comprising 1.0 M sulfuric acid, 0.28 M copper sulfate, 0.15 M stannous sulfate, 0.1 M iron chloride, and 200 ppm of citric acid. A columnar copper-tin-iron alloy structure was deposited at a current density of about 0.1 A/cm². Three-dimensional copper-tin-iron alloy porous dendritic structures were deposited on the columnar copper-tin-iron alloy structure at a current density of about 1.0 A/cm². The process was performed at room temperature. Silicon-graphite and stabilized lithium metal powder (SLMP®) were deposited over the three-dimensional copper-tin-iron dendritic structure using an electrostatic spray process. The anode structure was calendered to achieve a copper-tin-iron-lithium alloy electrode structure having a final porosity of about 30%.

Example #6

A substrate was placed in an electroplating chamber comprising a Pt(Ti) anode with a surface area of about 30×30 cm². A three-dimensional copper-tin-iron porous electrode structure was formed in a plating solution initially comprising 1.0 M sulfuric acid, 0.28 M copper sulfate, 0.23 M stannous sulfate, 0.1 M iron chloride, and 200 ppm of citric acid. A columnar copper-tin-iron structure was deposited at a current density of about 0.2 A/cm². Three-dimensional porous copper-tin-iron-lithium structures were deposited on the columnar copper-tin-iron-lithium structure at a current density of about 1.0 A/cm². The process was performed at room temperature. Silicon-graphite and SLMP® were deposited over the three-dimensional copper-tin-iron-lithium dendritic structure using an electrostatic spray process. The anode structure was calendered to achieve a final porosity of about 30%.

FIG. 5A is a scanning electron microscope (SEM) image of a cross-section of a composite layer containing a three dimensional plated electrode structure 510 with anodically active particles 520 deposited thereon at 100× magnification according to embodiments described herein. FIG. 5B is a SEM image of an enlarged portion of the cross-section of the composite layer of FIG. 5A at 500× magnification according to embodiments described herein. The three dimensional plated structure 510 may be a copper-tin-iron three dimensional structure as previously described herein, The three dimensional plated structure 510 is deposited directly on the current collector 530. The anodically active particles 530 may comprise silicon-graphite particles. The anodically active particles 530 may be deposited using an electrostatic spray process.

Certain embodiments described herein provide for a Li-ion battery cell structure having a three-dimensional alloy anode with high volumetric energy density (e.g, between 500 to 740 Wh/L) with high current loading (e.g., ≥4.5 mAh/cm²). Certain embodiments described herein provide for energy storage devices formed using water based processes instead of organic solvent based processes, thereby eliminating organic solvent recovery and associated costs. Certain embodiments described herein provide for a mechanically stable three-dimensional CuSnFe structure having sprayed silicon deposited thereon having an energy density of 1,000 to 2,000 mAh/g. The CuSnFe/Si anode described herein can store a significantly higher number of lithium ions per unit weight or volume than current carbon based anodes.

While the foregoing is directed to embodiments of the invention, other and further embodiments of the invention may be devised without departing from the basic scope thereof.

What is claimed is:

1. A method of forming a porous three-dimensional electrode microstructure, comprising:
depositing tin particles on one or more surfaces of a conductive collector substrate;
forming a three-dimensional copper-tin-iron porous conductive matrix on the tin particles and the one or more surfaces of the conductive collector substrate using an electroplating process, comprising:
positioning the conductive collector substrate in an electroplating solution;
depositing a columnar metal layer over the conductive collector substrate at a first current density by a diffusion limited deposition process; and
depositing porous conductive dendritic structures over the columnar metal layer at a second current density greater than the first current density; and
depositing an anodically active material over the three-dimensional copper-tin-iron porous conductive matrix, wherein the electroplating solution comprises a tin source, a copper source, and an iron source.

2. The method of claim 1, further comprising:
compressing the anodically active material into the porous three-dimensional copper-tin-iron porous conductive matrix.

3. The method of claim 2, wherein the compressing the anodically active material reduces the porosity of the electrode microstructure from an initial porosity of from about 40% to about 50% to a final porosity of from about 20% to about 30%.

4. The method of claim 2 wherein the compressing the anodically active material further comprises heating the three-dimensional copper-tin-iron porous conductive matrix and anodically active material to a temperature from about 100° C. to about 250° C.

5. The method of claim 1, wherein the first current density is between about 0.05 A/cm$^2$ to about 3.0 A/cm$^2$ and the second current density is between about 0.3 A/cm$^2$ to about 3 A/cm$^2$.

6. The method of claim 1, wherein the anodically active material is deposited using at least one of chemical vapor deposition (CVD) techniques, hydraulic spray techniques, atomizing spray techniques, electrostatic spray techniques, plasma spray techniques, and thermal or flame spray techniques.

7. The method of claim 1, wherein the anodically active material comprises particles selected from the group comprising graphite, graphene hard carbon, carbon black, carbon coated silicon, silicon carbide, amorphous silicon, crystalline silicon, silicon alloys, p-doped silicon, composites thereof and combinations thereof.

8. The method of claim 1, wherein the electroplating solution comprises copper sulfate ($CuSO_4$), stannous sulfate, and iron chloride.

9. The method of claim 1, wherein the electrode microstructure has a porosity of between about 20% to about 30% compared to a solid film formed from the same material.

10. The method of claim 1, wherein the columnar metal layer has a plurality of columnar projections comprising a macro-porous structure that has a plurality of macroscopic pores between about 5 and about 200 microns in size and the porous conductive dendritic structures have a plurality of meso-pores that are between about 10 nanometers and about 1,000 nanometers in size.

11. The method of claim 1, wherein the anodically active material comprises at least one of: silicon and graphite.

12. The method of claim 1, wherein the three-dimensional copper-tin-iron porous conductive matrix further comprises lithium.

13. The method of claim 1, wherein the conductive substrate is a flexible conductive substrate comprising copper.

* * * * *